(12) United States Patent
Laifenfeld et al.

(10) Patent No.: US 10,677,892 B2
(45) Date of Patent: Jun. 9, 2020

(54) INCREASING RESOLUTION AND RANGE FOR I-Q LINEAR FREQUENCY MODULATED RADAR

(71) Applicant: GM GLOBAL TECHNOLOGY OPERATIONS LLC, Detroit, MI (US)

(72) Inventors: Moshe Laifenfeld, Haifa (IL); Alexander Pokrass, Bat Yam (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 294 days.

(21) Appl. No.: 15/592,617

(22) Filed: May 11, 2017

(65) Prior Publication Data
US 2018/0329030 A1    Nov. 15, 2018

(51) Int. Cl.
*G01S 7/35*  (2006.01)
*G01S 13/931*  (2020.01)
*G01S 13/42*  (2006.01)
*G01S 13/34*  (2006.01)

(52) U.S. Cl.
CPC ............ *G01S 7/352* (2013.01); *G01S 13/343* (2013.01); *G01S 13/42* (2013.01); *G01S 13/931* (2013.01); *G01S 2007/356* (2013.01); *G01S 2007/358* (2013.01); *G01S 2013/9318* (2020.01); *G01S 2013/9319* (2020.01)

(58) Field of Classification Search
CPC ........ G01S 7/352; G01S 13/343; G01S 13/42; G01S 13/931; G01S 2013/935; G01S 2007/356; G01S 2007/358; G01S 2013/9342
USPC .......................................................... 372/70
See application file for complete search history.

(56) References Cited

U.S. PATENT DOCUMENTS

| | | | | |
|---|---|---|---|---|
| 5,914,986 | A * | 6/1999 | Ohta | H03D 1/2245 375/328 |
| 2002/0106039 | A1* | 8/2002 | Sugita | H04B 1/71072 375/343 |
| 2013/0082858 | A1* | 4/2013 | Chambers | G01S 13/90 342/22 |
| 2015/0192627 | A1* | 7/2015 | Rubesa | G01N 37/005 324/76.51 |
| 2015/0341138 | A1* | 11/2015 | Ishihara | H04B 10/25133 398/35 |

\* cited by examiner

*Primary Examiner* — Frank J McGue
(74) *Attorney, Agent, or Firm* — Cantor Colburn LLP

(57) ABSTRACT

A radar system and method of extending a parameter of a location of a target obtained by radar is disclosed. The system receives an echo signal that is a reflection of a radar source signal from the target. The echo signal is sampled and a peak for the echo signal is objected in frequency space. For a peak that is located at a frequency greater than a Nyquist frequency of the echo signal, the peak is moved to a negative domain of the frequency space and the location of the target is determined using the peak in the negative domain.

17 Claims, 6 Drawing Sheets

INCREASING RESOLUTION AND RANGE FOR I-Q LINEAR FREQUENCY MODULATED RADAR

FIELD OF THE INVENTION

The subject invention relates to systems and methods for improving radar measurements and, in particular, for extending a range and resolution of a radar system.

BACKGROUND

Automobiles and other vehicles have come to employ safety systems which include radar technologies for detecting a location of an object or target with respect to the vehicle so that a driver or collision-avoidance device can react accordingly. A radar system includes a transmitter for sending out a source signal and a receiver for receiving an echo or reflection of the source signal from the target. The received signal is sampled at a selected sampling frequency and the sampled data points of the received signal are entered into a Fast Fourier Transform (FFT) in order to determine the frequency of the returning signal. A range or relative velocity of the target with respect to the vehicle can be determined from this frequency.

A maximum range at which a target's location can unambiguously be determined is related to a highest frequency component of the echo signal. Frequencies above a Nyquist frequency (which is related to the highest frequency component) are often filtered out of the frequency space prior to distance determination because such frequencies are considered to be aliased frequencies related to false distance readings. To increase an unambiguous range, new hardware having higher radar frequencies and higher sampling rates can be installed in the vehicle. However, such hardware and installations increase the cost of the vehicle. Accordingly, it is desirable to provide a method for increasing a range and/or resolution of a radar signal using existing radar systems.

SUMMARY OF THE INVENTION

In an exemplary embodiment of the invention, a method is disclosed for extending a parameter of a location of a target obtained by radar. The method includes: receiving an echo signal that is a reflection of a radar source signal from the target; obtaining a peak in a frequency space for the echo signal, wherein the peak is located at a frequency greater than a Nyquist frequency of the echo signal; moving the peak to a negative domain of the frequency space; and determining the location of the target using the peak in the negative domain.

In another exemplary embodiment of the invention, a radar system is disclosed. The radar system includes a transmitter configured to generate a radar source signal; a receiver configured to receive an echo signal that is a reflection of the radar source signal from a target; and a processor. The processor is configured to: sample the echo signal at a sampling frequency, obtain a peak in a frequency space for the sampled echo signal, wherein the peak is located at a frequency greater than a Nyquist frequency of the echo signal, move the peak to a negative frequency domain of the frequency space, and determine a location of the target using the peak in the negative domain.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
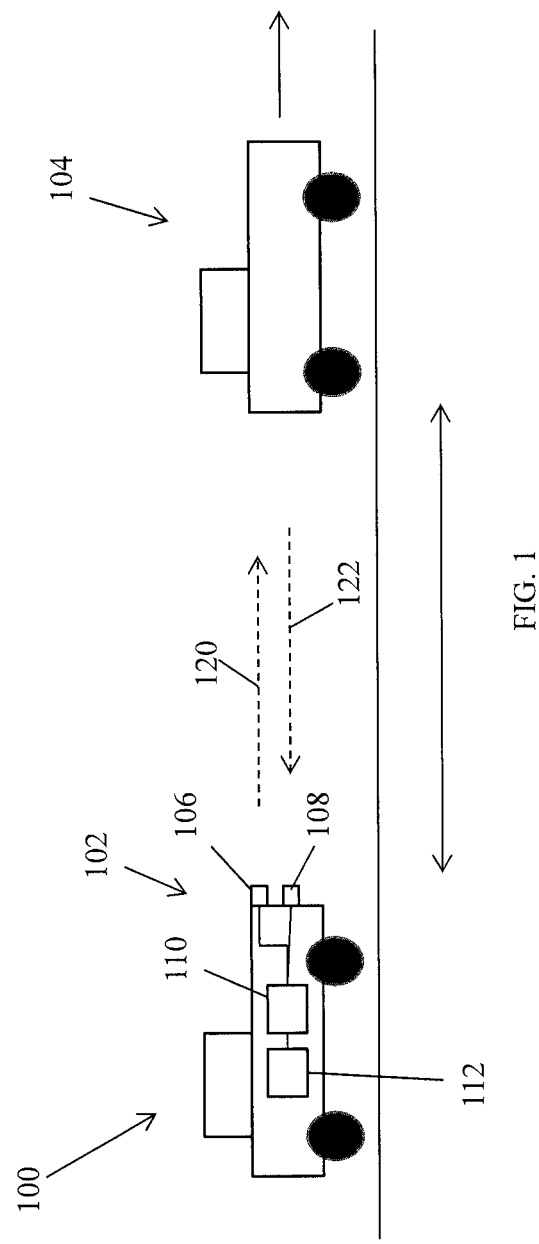
FIG. 1 shows a vehicle, such as an automobile, that includes a radar system suitable for determining a distance and/or a relative velocity of an object or target with respect to the vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 shows a vehicle 100, such as an automobile, that includes a radar system 102 suitable for determining a distance and/or a relative velocity of an object or target 104 with respect to the vehicle 100. In the embodiment shown in FIG. 1, the radar system 102 includes a transmitter 106 and a receiver 108. In alternate embodiments, the radar system 102 may be a MIMO (multi-input, multi-output) radar system that includes an array of transmitters and an array of receivers. A control unit 110 on-board the vehicle 100 controls and operates the transmitter 106 to generate a radio frequency wave (a "source signal" 120). In an embodiment, the source signal 120 includes a linear frequency-modulated continuous wave (LFM-CW), often referred to as a chirp signal. Alternately, the source signal 120 can be a pulsed signal or a combination of pulsed and chirp signals. A reflection of the source signal 120 from the target 104 is referred to herein as an echo signal 122. The echo signal 122 is received at the receiver 108, which generally includes circuitry for sampling the echo signal 122. The control unit 110 performs calculations on the echo signal 122 in order to determine distance and/or a relative velocity of the target 104 with respect to the vehicle 100. Knowledge of the distance and/or relative velocity of the target 104 with respect to the vehicle 100 can then be used to maneuver the vehicle 100 by, for example, accelerating or decelerating the vehicle 100 or steering the vehicle in order to avoid the target 104. In an embodiment, the control unit 110 determines distance and/or velocity of the target 104 and cooperates with a collision-avoidance system 112 to control steering and acceleration/deceleration components to perform necessary maneuvers at the vehicle 100 to avoid the target 104. In another embodiment, the control unit 110 provides a signal to alert a driver of the vehicle 100 so that the driver can take any necessary action to avoid the target 104.

While the radar system 102 is discussed herein as being on-board vehicle 100, the radar system 102 may also be part of an immobile or stationary object in alternate embodiments. Similarly, the target 104 can be a vehicle or moving object or can be an immobile or stationary object.

Figure 2:
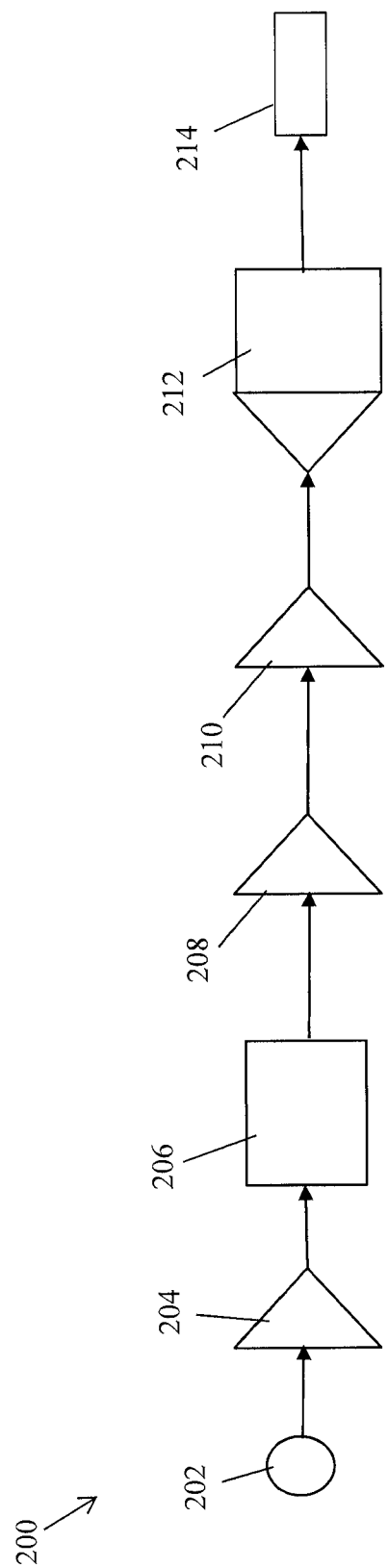
FIG. 2 shows an exemplary front end of a receiver system for the exemplary radar system of FIG. 1.

FIG. 2 shows an exemplary front end 200 of a receiver system for the exemplary radar system of FIG. 1. The front end 200 includes a receiver antenna 202 that receives the echo signal 122 of FIG. 1. An electrical signal generated by the echo signal 122 is sent from the receiver antenna 202 through a low noise amplifier (LNA) 204 that amplifies signals without significantly degrading a signal-to-noise ratio (SNR). The amplified signal is sent to a mixer 206. The mixer 206 combines both in-phase and quadrature components of the echo signal 122. The combined signal undergoes filtering via a high-pass filter 208 and a low-pass filter 210. Analog-to-digital converter (ADC) 212 converts the filtered signal to a digital signal by sampling the filtered signal at a selected sampling frequency. The digital signal is provided to a digital signal processor (DSP) 214, which performs the various methods disclosed herein for determining a distance and/or a velocity of a target. The DSP 214 generates a discrete frequency spectrum of the digital signal. In an embodiment, the DSP 214 performs a Fast Fourier Transform (FFT) on the digital signal to obtain the discrete frequency spectrum. Peaks within the frequency spectrum are representative of the echo signal and are used to determine location and/or velocity of the target 104. Other transforms besides FFT can be used in alternate embodiments. The peaks can be used for either range determination or velocity determination. Range determination can be performed first and a filter then applied for removing negative frequencies, after which velocity determination can be performed.

Figure 3A:
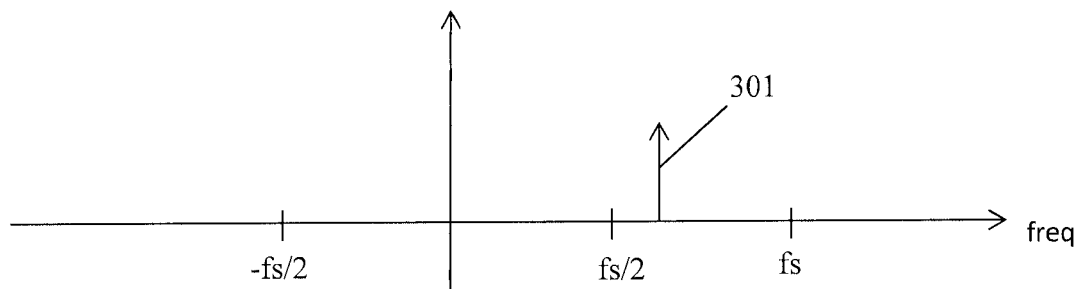
FIGS. 3A-3C show a frequency space during various stages of a method disclosed herein for increasing a range of the radar system for a selected radar signal.
Figure 3B:
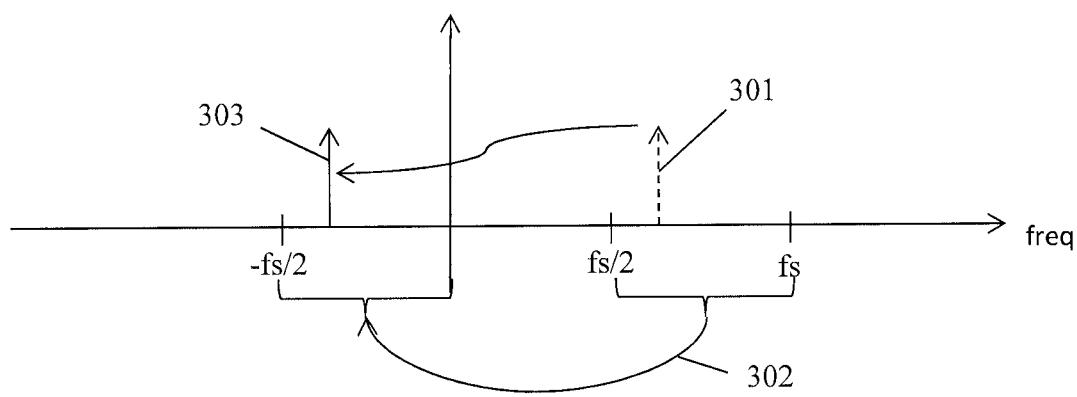
Figure 3C:
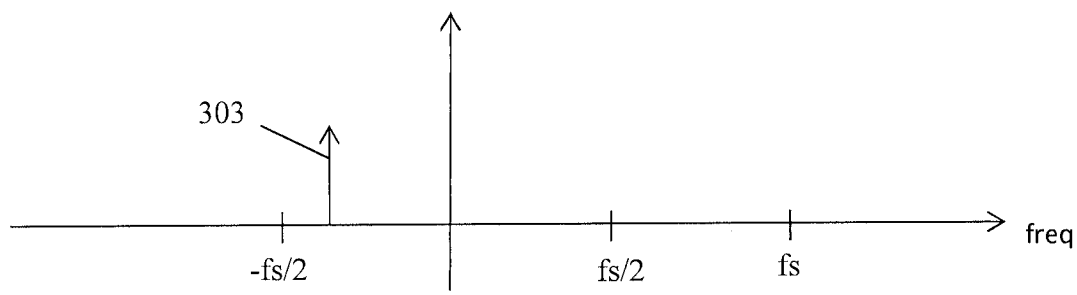

FIGS. 3A-3C show a frequency space during various stages of a method disclosed herein for increasing a range of the radar system for a selected radar signal. FIG. 3A shows a peak 301 that is formed in the frequency space, wherein the peak 301 indicates a frequency obtained by digitally sampling of the echo signal 122 and performing an FFT on the sampled signal. A Nyquist frequency for the echo signal is shown in the frequency space and is indicated by $f_s/2$. In general, the Nyquist frequency is half of the maximum frequency component of the signal that is desired to be sampled. For the method of increasing the range of the radar system, the echo signal 122 is sampled at the Nyquist frequency. Peaks appearing in the frequency space at frequencies that are greater than the Nyquist frequency $f_s/2$ are aliased frequencies that are a result of the target 104 being further away from the vehicle 100 than a maximum unambiguous range of the radar system.

For illustrative purposes, peak 301 is an aliased frequency (greater than the Nyquist frequency). A filter may be applied to the frequency space in order to remove any frequencies outside of the domain from 0 to $f_s$. In accordance with the methods of the invention, frequency peaks that are at frequencies between $f_s/2$ and $f_s$ (e.g., peak 301) are moved to a negative frequency space, as indicated by arrow 302. In particular, peaks at frequencies between $f_s/2$ and $f_s$ are moved to the domain of the frequency space between $-f_s/2$ and zero. FIG. 3B shows peak 301 being moved to the location of peak 303. In an embodiment, in order to move peak 301, twice the Nyquist frequency is subtracted from the frequency of peak 301. In other words, $f_{303}=f_{301}-f_s$, where $f_{303}$ is the peak in the negative frequency space and $f_{301}$ is the peak originally created by the FFT. All other frequency peaks between $f_s/2$ and $f_s$ can be similarly moved. FIG. 3C shows the frequency space after aliased peak 301 has been moved to the negative frequency space. The peak $f_{303}$ in the negative frequency space can be used in subsequent calculations to determine a range of the target when the target is at a distance that is greater than the maximum unambiguous range of the radar system indicated by the Nyquist frequency. Since the FFT produces complex frequency components (in-phase and quadrature), the content in the negative frequency space is easily distinguishable from the content in the positive frequency space. Using the frequencies in the negative frequency space (as well as any frequency peaks that may occur between 0 and $f_s/2$), the maximum range of the target can be doubled from the maximum range that is obtained using only the frequencies between 0 and $f_s/2$. Additionally, this range doubling occurs using currently-existing radar system, i.e., without the need to increase hardware complexity via additional hardware components or redesigning of existing hardware components.

Figure 4A:
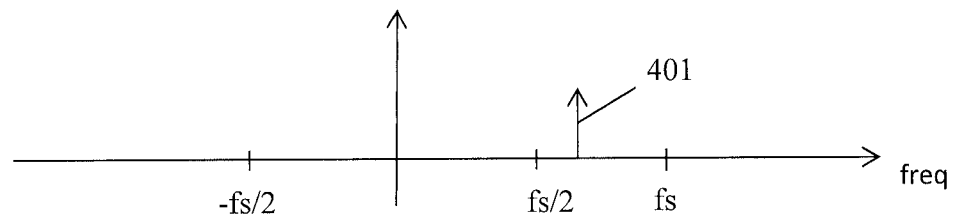
FIGS. 4A-4C show a frequency space during various stages of a method disclosed herein for increasing a resolution of the radar system.
Figure 4B:
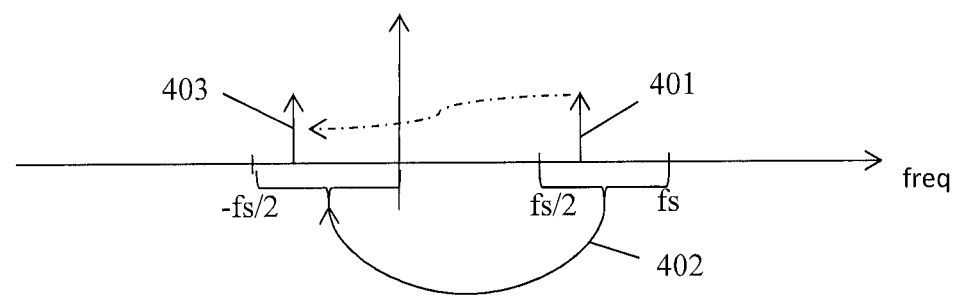
Figure 4C:
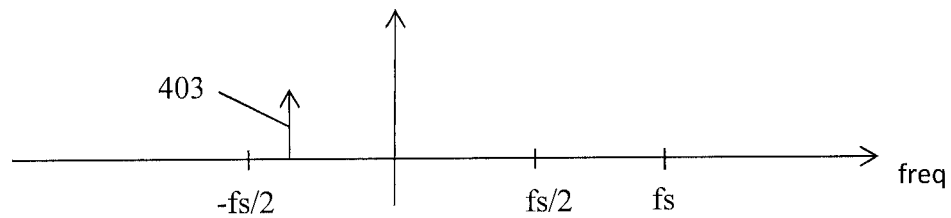

FIGS. 4A-4C show a frequency space during various stages of a method disclosed herein for increasing a resolution of the radar system. FIG. 4A shows a frequency spectrum by performing an FFT on the echo signal 122, wherein the echo signal 122 is sampled at half of the Nyquist frequency rather than at the Nyquist frequency. In an embodiment, sampling at half of the Nyquist frequency can be achieved by sampling the echo signal at the Nyquist frequency and then using only every other sampled point in the FFT. Sampling at half of the Nyquist frequency produces aliased peaks, such as peak 401, in the frequency spectrum. In order to increase resolution, the aliased peaks are moved to the negative frequency space, as indicated by arrow 402. FIG. 4B shows peak 401 being moved from to the negative frequency space to create peak 403. In an embodiment, twice the Nyquist frequency is subtracted from the frequency of peak 401 in order to obtain peak 403. In other words, $f_{403}=f_{401}-f_s$, where $f_{403}$ is the frequency of peak 401 in the negative frequency space and $f_{401}$ is the frequency of peak 401. All other peaks between $f_s/2$ and $f_s$ are moved to negative frequency space in this manner. FIG. 4C shows the resulting frequency space after peak 401 has been moved to peak 403. Since the FFT produces complex frequency components (in-phase and quadrature), the content in the negative frequency space is easily distinguishable from the content in the positive frequency space. The peaks in the negative frequency space are used in subsequent calculations to determine a location of the target. Using the peaks in the negative frequency space in subsequent calculations increases a resolution of the signal over a resolution obtained using only peaks between 0 and $f_s/2$.

Figure 5:
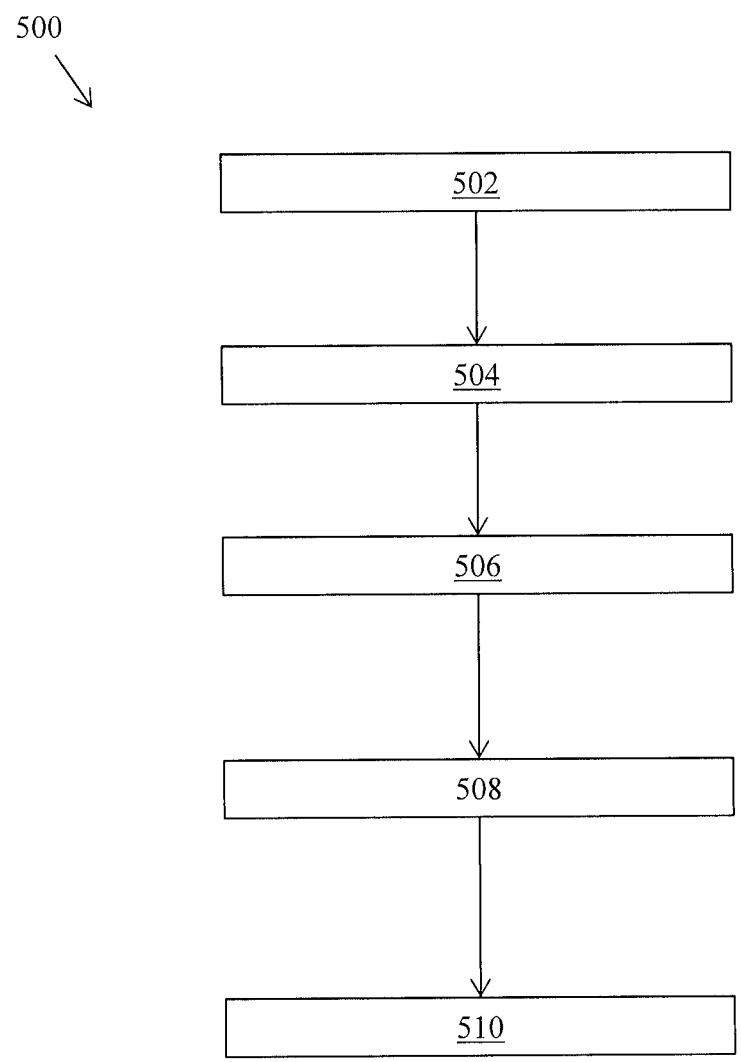
FIG. 5 shows a flowchart illustrating a method of the present invention for increasing a range of a radar system.

FIG. 5 shows a flowchart 500 illustrating a method of the invention for increasing a range of a radar system. In Box 502, an echo signal is obtained from reflection of a radar source signal from a target. In Box 504, the echo signal is sampled at a Nyquist sampling rate and an FFT is performed on the echo signal to obtain a frequency of related to the echo signal in frequency space. In Box 506, an anti-aliasing filter is applied to the frequency space to allow peaks that are between 0 and $f_s$ and to remove peaks outside of this domain. In Box 508, peaks that are between $f_s/2$ and $f_q$ are moved to between $-f_s/2$ and 0. In Box 510, the modified frequency space is used to determine a distance to the target. In an embodiment, the frequencies used to determine this distance are between $-f_s/2$ and 0, although frequencies between $-f_s/2$ and $f_s/2$ can be used in alternate embodiments.

Figure 6:
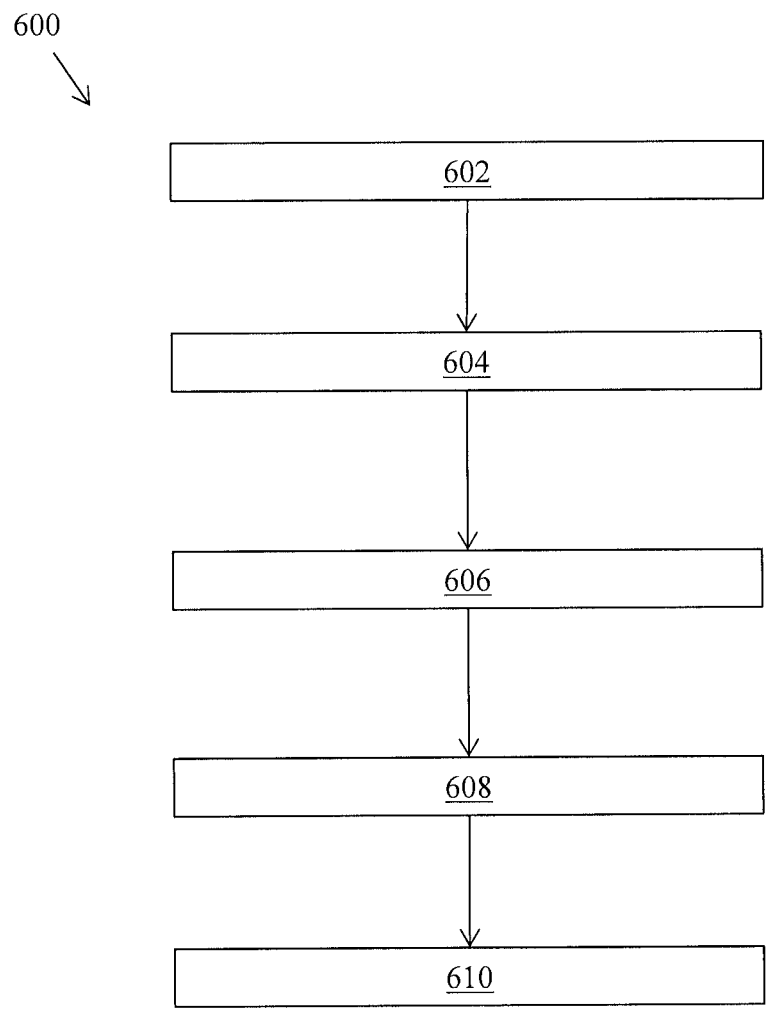
FIG. 6 shows a flowchart illustrating a method of the present invention for increasing a resolution of a radar system.

FIG. 6 shows a flowchart 600 illustrating a method of the invention for increasing a resolution of a radar system. In Box 602, an echo signal is obtained from reflection of a radar signal from a target. In Box 604, the echo signal is sampled at a non-optimal sampling frequency, e.g., at half of the Nyquist frequency. In Box 606, an FFT is performed on the sampled signal to obtain peaks in frequency space, wherein use of the non-optimal sampling frequency produces aliased peaks. In Box 608, the aliased peaks produced using the non-optimal sampling frequency are moved to a negative frequency space. In particular, peaks that are between $f_s/2$ and $f_s$ are moved to between $-f_s$ and 0. In Box 610, the frequencies in the negative frequency space (between $-f_s/2$ and 0 are used to determine a distance to the target, although frequencies between $-f_s/2$ and $f_s/2$ can be used to determine distance in alternate embodiments.

The methods disclosed herein provide improvements to one or more or a range of the radar system and a resolution of the radar system. These improvements are obtained by performing additional computational steps with already existing radar systems and therefore can extend range and resolution without the need for additional hardware components. The improvements to the distance measurements of the target 104 can be provided to the driver or collision avoidance system and the driver or collision avoidance system can react to avoid the target, thus increasing a safety of the driver and vehicle.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of extending a parameter of a location of a target obtained by radar, comprising:
   receiving an echo signal that is a reflection of a radar source signal from the target, the radar source signal transmitted from a radar system;
   obtaining a peak in a frequency space for the echo signal, wherein the peak is located at a frequency greater than a Nyquist frequency of the echo signal;
   moving the peak to a negative domain of the frequency space by subtracting twice the Nyquist frequency from the frequency of the peak; and
   determining, using the peak in the negative domain, the location of the target at a range greater than a maximum unambiguous range of the radar system indicated by the Nyquist frequency.

2. The method of claim 1, wherein obtaining the peak further comprises performing a Fast Fourier Transform on the echo signal.

3. The method of claim 1, wherein the peak is located between the Nyquist frequency and twice the Nyquist frequency.

4. The method of claim 3, wherein the negative frequency domain is between a negative of the Nyquist frequency $(-f_s/2)$ and zero.

5. The method of claim 1, further comprising applying an anti-aliasing filter to the frequency space, wherein the anti-aliasing filter has a cut off frequency that is twice the Nyquist frequency.

6. The method of claim 1, wherein the parameter is a range of the location, further comprising sampling the echo signal at the Nyquist frequency.

7. The method of claim 1, wherein the parameter is a resolution of the location, further comprising sampling the echo signal at half the Nyquist frequency.

8. The method of claim 1, further comprising maneuvering a vehicle to avoid the target from the determined location.

9. The method of claim 1, further comprising determining the location of the target using the peak in the negative domain and a set of frequency peaks in the positive frequency domain less than the Nyquist frequency when the range of the target is greater the a maximum range that can be determined using only the frequency peaks in the positive frequency domain less than the Nyquist frequency.

10. A radar system, comprising:
    a transmitter configured to generate a radar source signal;
    a receiver configured to receive an echo signal that is a reflection of the radar source signal from a target; and
    a processor configured to:
       sample the echo signal at a sampling frequency,
       obtain a peak in a frequency space for the sampled echo signal, wherein the peak is located at a frequency greater than a Nyquist frequency of the echo signal,
       move the peak to a negative frequency domain of the frequency space by subtracting twice the Nyquist frequency from the frequency of the peak, and
       determine, using the peak in the negative domain, the location of the target at a range greater than a maximum unambiguous range of the radar system indicated by the Nyquist frequency.

11. The system of claim 10, wherein the processor obtains the peak by performing a Fast Fourier Transform on the sampled echo signal.

12. The system of claim 11, further comprising a collision-avoidance device that receives the range from the radar system and maneuvers the vehicle to avoid the target from the parameter.

13. The system of claim 10, wherein the peak is located in frequency space between the Nyquist frequency and twice the Nyquist frequency.

14. The system of claim 13, wherein the negative frequency domain is between a negative of the Nyquist frequency $(-f_s/2)$ and zero.

15. The system of claim 10, wherein the processor applies an anti-aliasing filter having a cut off frequency that is twice the Nyquist frequency to the frequency space.

16. The system of claim 10, wherein the processor samples the echo signal at the Nyquist frequency.

17. The system of claim 10, wherein the processor samples the echo signal at half the Nyquist frequency to increase a resolution of the location.

* * * * *